United States Patent [19]

Brodersen

[11] Patent Number: 4,799,821

[45] Date of Patent: Jan. 24, 1989

[54] METHOD AND APPARATUS FOR CONTAINMENT AND/OR DIRECTING THE FLOW OF SPILLED HAZARDOUS LIQUIDS

[76] Inventor: John C. Brodersen, 1894 Meadowridge Rd., Prescott, Ariz. 86301

[21] Appl. No.: 79,950

[22] Filed: Jul. 31, 1987

[51] Int. Cl.⁴ ............................................... E02B 7/00
[52] U.S. Cl. ...................................... 405/115; 405/52
[58] Field of Search ................... 405/91, 107, 115, 52, 405/63, 66, 68, 80

[56] References Cited

U.S. PATENT DOCUMENTS

| | | | |
|---|---|---|---|
| 2,674,855 | 4/1954 | Taylor | 405/91 |
| 3,855,800 | 12/1974 | Ganzinotti | 405/91 |
| 4,458,456 | 7/1984 | Battle | 405/115 X |

FOREIGN PATENT DOCUMENTS 2815256 10/1979 Fed. Rep. of Germany ...... 405/115

*Primary Examiner*—David H. Corbin
*Attorney, Agent, or Firm*—Cahill, Sutton & Thomas

[57] ABSTRACT

A dike structure for use in containment and/or controlling the flow of spilled hazardous liquids includes an elongated flexible tube formed of a chemically resistant plastic which is deployed as needed at the spill site and filled with water to form a base for the dike structure. A suitable joint packing material is used as needed to form a leak-proof seal between the water filled tube and the ground surface upon which it is deployed.

14 Claims, 1 Drawing Sheet

METHOD AND APPARATUS FOR CONTAINMENT AND/OR DIRECTING THE FLOW OF SPILLED HAZARDOUS LIQUIDS

BACKGROUND OF THE INVENTION

1. Field of the Invention

This invention relates in general to a liquid containment device and more particularly to a method and apparatus for containment and/or controlling the flow of hazardous liquid spills.

2. Description of the Prior Art

Whenever leakage or other spilling of hazardous liquids such as acid or gasoline occurs, one of the major concerns is the containment and/or controlling the flow of the spilled liquid to minimize the production of the toxic and/or flammable vapors and prevent its flowing into undesirable previously uncontaminated areas. As is well known, as a spill of hazardous liquid spreads out, its surface area increases and the production of toxic and/or flammable vapors increases with the surface area. Therefore, containment of hazardous liquid spills should be rapidly accomplished to minimize spreading of the hazardous liquid and to provide efficient usage of the foam which is commonly used for preventing the production of dangerous fumes. Further, whenever a hazardous liquid, such as gasoline, is spilled in the streets, the spilled liquid must be kept from flowing into a storm drain system where the vapors can rapidly spread far beyond the control of the trained personnel whose job it is to control and clean-up the spill.

The fire departments of most municipalities have a team, or teams, of highly trained people, usually referred to as a hazardous material handling team or "hazmat" for short, which is highly mobile for responding to calls concerning any emergency situation involving hazardous materials such as the above mentioned spillage of hazardous liquids. In that such teams are highly mobile, as are all fire fighting personnel and equipment, it is difficult if not impossible for them to transport traditional spill containment materials such as sand, with them. Therefore, it is a common practice for such teams to use whatever they can find in the vicinity of a hazardous liquid spill for making up sand bags or otherwise building dikes for containing and/or controlling the flow of the spilled hazardous liquid.

Such prior art spill containment and flow directing techniques are not without problems in that some spill sites lack a readily available supply of suitable materials and even if they do, collecting and readying such materials for use can be very labor intensive and slow. In extreme cases, fire hoses filled with water have been used as a dike. However, this is a last resort in that fire hoses are expensive and many hazardous liquids will ruin a hose due to chemical action, and a water filled hose is a very poor dike. Therefore, many hazardous liquid spills are not contained at all and when contained, are inadequate from desired safety and subsequent clean-up standpoints.

Therefore, a need exists for a new and useful method and apparatus for containment and/or controlling the flow of hazardous liquid spills which overcomes some of the problems and shortcomings of the prior art.

SUMMARY OF THE INVENTION

In accordance with the present invention, a new and useful method and apparatus for containment and/or controlling the flow of hazardous liquid spills are disclosed. An elongated tube formed of a chemically resistant synthetic resin such as low density polyethylene is employed as a base for erecting a liquid containment or flow controlling dike structure. The elongated tube is provided in rolls for minimal utilization of storage space on the transporting equipment used by the hazardous materials handling team. When needed, the tube is unrolled and one end is closed preferably by tying it in a knot. Then the tube is deployed in the desired liquid containment or flow controlling position and filled with water and the other end is closed, again by preferably being tied in a knot. When deployed and filled, the tube will flatten out on its ground engaging surface due to the weight of the water contained in the tube. The quality of the seal between the tube and the ground is directly related to the smoothness of the ground surface and in many instances a suitable packing material will be needed to fill the junction between the tube and the ground to provide a leak-proof dike. The physical location of the packing material depends on the nature of the spilled liquid and the type of packing material used.

When dirt is the only packing material available, it is advantageously used to fill the junction on the spill side of the tube, and if the spilled liquid contains water, or water is to be used in cleaning up the liquid it is best to use dirt in the manner described. However, is no water is contained in the spilled liquid and is not to be used in the clean-up operation, it is preferred that a commercially available packing material be used to fill the junction of the dry side of the tube. Such commercially available packing material usually comes in a dry granulated form which turns into a pliable putty-like material when moistened such as by spraying with water. One such packing material is marketed under the name "Plug and Dike" and is available from the PND Corporation, 1813 130th N.E., Suite 111, Bellview, Wash., 98005.

Accordingly, it is an object of the present invention to provide a new and useful method and apparatus for containment and/or controlling the flow of spilled hazardous liquids.

Another object of the present invention is to provide a new and useful method and apparatus for erecting a dike structure for containment and/or controlling the flow of spilled hazardous liquids with the dike being simple and easy to erect from inexpensive materials which can be easily stored and transported by a hazardous materials handling team.

Another object of the present invention is to provide a new and useful method and apparatus of the above described character which includes an elongated tube formed of a chemically resistant synthetic resin which is filled with water and deployed in the desired position proximate the spilled hazardous liquid with a packing material being used to form a leak-proof seal at the junction of the tube and the ground surface.

The foregoing and other objects of the present invention as well as the invention itself may be more fully understood from the following description when read in conjunction with the accompanying drawing.

DESCRIPTION OF THE PREFERRED EMBODIMENTS

Figure 1:
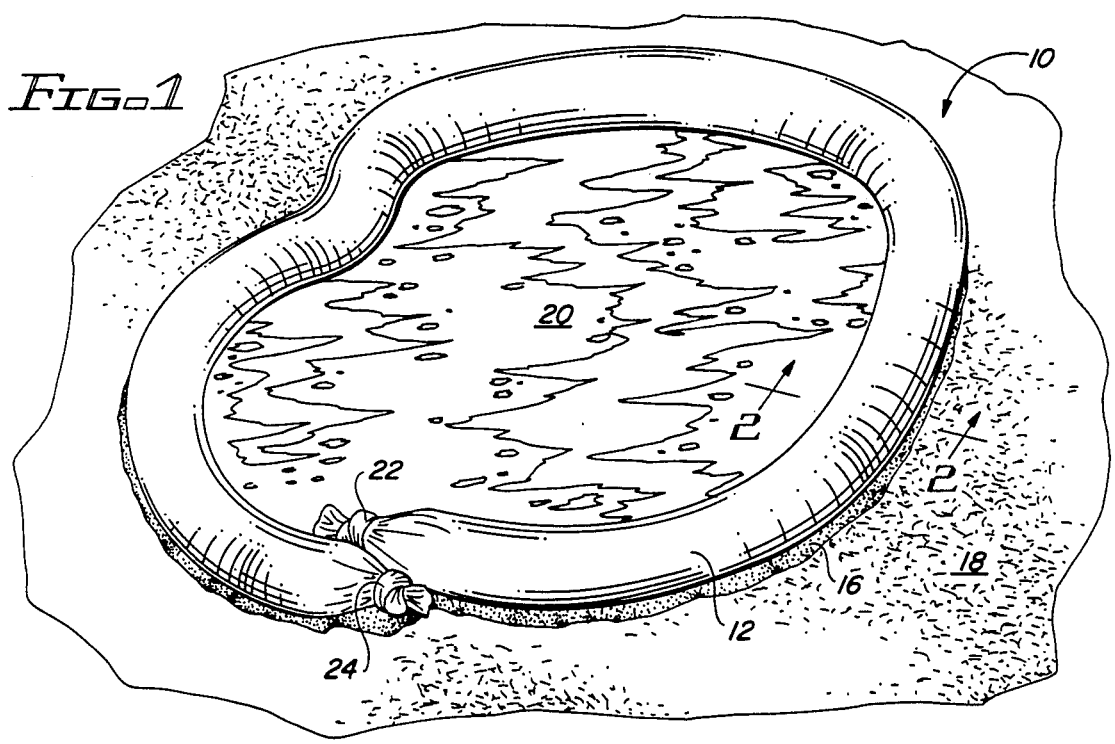
FIG. 1 is a perspective view showing the dike structure of the present invention as being deployed about a spilled hazardous liquid for containment thereof.

Referring more particularly to the drawings. FIG. 1 shows the dike structure of the present invention which is indicated in its entirety by the reference numeral 10. As will hereinafter be described in detail, the dike structure 10 includes an elongated flexible tube 12 which is filled with water 14 to provide a base for the dike structure, and a joint packing material 16 that completes the erection of the dike structure 10 by forming a leak-proof seal between the water filled tube and the ground surface 18 upon which it is deployed.

The dike structure 10 is employed for containment and/or directing the flow of a spilled hazardous liquid 20. In FIG. 1, the dike structure 10 is shown as having been deployed and erected in a surrounding position about the spilled hazardous liquid 20 for containment thereof. Such containment prevents spreading of the liquid 20 and thus facilitates clean-up as is well known in the art. Due to the elongated and flexible nature of the tubing, the dike structure 10 can be deployed and erected in whatever position it takes to surround the spilled liquid 20. However, in some situations, it may be more desirable to deploy and erect the dike structure 10 in a manner so that it controls the flow of the spilled hazardous liquid, for example, to prevent the liquid from flowing into a storm drain system. Prior to being used, the tubing 12 is in a flattened state and rolled up to form a compact package which is simple to handle and occupies a minimum amount of storage space in the transport vehicle used by the hazardous material handling team. It has been found that forming the tubing of a 10 mil thick synthetic resin with a filled diameter of about seven inches, and supplying it in one hundred foot lengths will satisfy most if not all the containment and/or flow directing problems normally associated with spilled hazardous liquids.

To use the tubing 12 in building and deploying the dike structure 10 of the present invention, the tubing 12 is unrolled and cut to the desired length if less than the total length of the supplied tubing is needed for a particular task. When unrolled, one of the otherwise open ends of the tubing 12 is closed, such as by tying it into a knot as shown at 22 in FIG. 1 then with the tubing 12 deployed in the desired position relative to the spilled liquid, the tubing 12 is filled with water from the other end of the tubing. Care should be taken not to entrap any significant amounts of air in the tubing and this can be accomplished by simply elevating the open end through which the tubing 12 is being filled. The above mentioned one hundred foot length of tubing having a filled diameter of about seven inches can be completely filled with about two hundred gallons of water. The water can be obtained from any suitable source at the spill site or can be obtained from the water supply that is carried on the emergency vehicle which the hazardous material handling team uses to transport them and their equipment to the spill site. In either case, when the tubing 12 is filled with water, its other end is closed such as by tying a knot 24 therein.

The opposite ends of the tubing 12 can be closed in other ways, such as by folding the ends back on themselves and using tape (not shown) to hold them in the folded closed positions. However, tying them into knots 22 and 24 is preferred in that the material of which the tubing is formed is chemically resistant whereas tape or any other closing means may not be.

Figure 2:
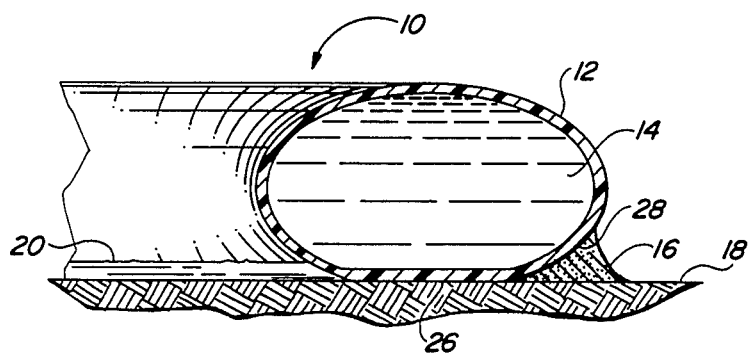
FIG. 2 is an enlarged fragmentary sectional view taken along the line 2—2 of FIG. 1 to show a first embodiment of the method of erecting the dike structure of the present invention.

As shown in FIG. 2, when the tubing 12 has been filled and its ends closed, the tubing will assume a somewhat elliptical cross sectional configuration due to the weight of the water 14 and a flattened portion 26 will exist where the tubing rests on the ground surface 18. The quality of the seal made between the flattened portion 28 of the tube 12 and the ground surface 18 will be directly related to the smoothness of the ground surface. Therefore, in all but rare instances, some seepage or leakage of the spilled hazardous liquid will occur between the tubing and the ground surface. To prevent such leakage or seepage, the joint packing material 16 is used in a grouting-like manner to form a leak-proof seal and thereby complete the erection of the dike structure 10 of the present invention.

Whenever the spilled hazardous liquid does not contain water and water will not be used in cleaning up the spilled liquid, such as in the case of spilled acid, a commercially available form of the joint packing material 16 is preferably used to fill the junction between the tubing 12 and the ground surface 18 on the dry, or downstream side of the tubing 12 as shown at 28 in FIG. 2. This type of packing material is normally in the form of a dry granulated substance which changes into a paste or putty-like substance when moistened such as by being sprayed with water. Packing materials of this sort are available from various sources with one particular product being marketed under the name "Plug and Dike" by the PND Corporation, 1813 130th N.E., Suite 111, Bellview, Wash., 98005.

As is customary in spills of petroleum products such as gasoline, water is often used to float the spilled petroleum as part of the clean-up operation. In such instances or any other situations involving water, the above mentioned commercially available product cannot be used as the joint packing material due to its being water soluble. In these spills where water is contained in the spill, or will be used as part of the clean-up task, any suitable non-soluble substance such as dirt can be used as the joint packing material 16 which is preferably used to pack and thus seal the junction on the wet, or upstream side of the tubing 12 as shown at 30 in FIG. 3.

Figure 3:
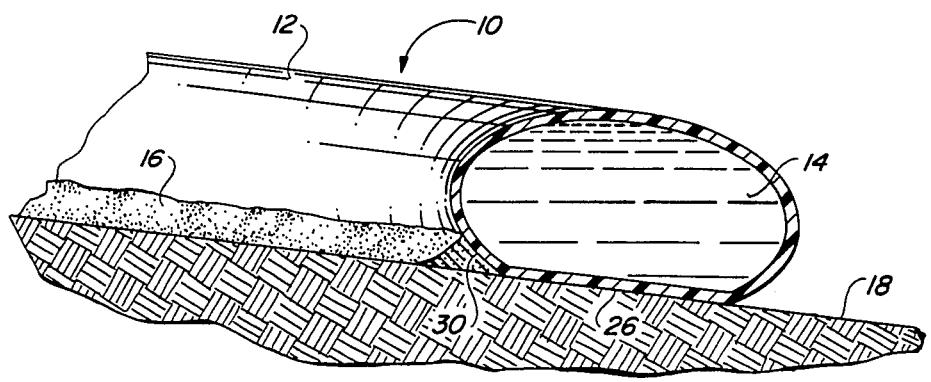
FIG. 3 is a fragmentary sectional view similar to FIG. 2 and showing a second embodiment of the method of erecting the dike structure of the present invention.

It will be understood that the extent of joint packing may vary from one spill site to the next. Some jobs may require complete packing of one or the other of the junctions 28 or 30 while other jobs may require considerably less. For example, if the hazardous liquid is spilled on a sloping ground surface 18, such as is shown in FIG. 3, then the lower end of the dike structure 10 will need to be sealed and the need for packing all or selected portions of the remaining junction will be determined by the conditions at the spill site and judgment of the hazardous material handling team.

While the principles of the invention have now been made clear in the illustrated embodiments, there will be immediately obvious to those skilled in the art, many modifications of structure, arrangements, proportions, the elements, materials and components used in the practice of the invention and otherwise, which are particularly adapted for specific environments and operation requirements without departing from those principles. The appended claims are therefore intended to cover and embrace any such modifications within the limits only of the true spirit and scope of the invention.

What I claim is:

1. A temporary emergency dike for restraining flow of a liquid along a surface upon which fluid has been or may be spilled, said dike comprising in combination:
   (a) elongated means for contacting a strip of the suface, said contacting means being sufficiently pliable to conform with perturbations and undulations of the surface to restrain the flow of fluid between the surface and said dike;
   (b) elongated means for extending above the surface, said elongated extending means, in combination with said elongated contacting means, defining an elongated envelope for receiving and retaining a quantity of water extending above and along the surface;
   (c) means for introducing the water into said envelope; and
   (d) means for manually knotting opposed ends of said envelope to retain the water introduced therein.

2. The dike as set forth in claim 1 wherein said envelope comprises a length of tubing and wherein each of said contacting means and said elongated extending means defines the circumferential wall of a length of tubing.

3. The dike as set forth in claim 2 wherein said wall of said tubing comprises a film of man-made plastic material.

4. The dike as set forth in claim 2 wherein the wall thickness of said tubing is ten (10) mils.

5. The dike as set forth in claim 4 wherein said wall of said tubing comprises a film of man-made plastic material.

6. The dike as set forth in claim 2 wherein said tubing comprises sufficient girth to retain two gallons of water per foot of length.

7. The dike as set forth in claim 6 wherein said tubing is one hundred (100) feet in length.

8. The dike as set forth in claim 1 including packing means for augmenting the restraint to water flow between said elongated contacting means and the surface.

9. The dike as set forth in claim 8 wherein said packing means is a quantity of granular material.

10. The dike as set forth in claim 9 wherein granular material becomes putty-like upon being wetted.

11. An emergency method for temporarily restraining flow of fluid along a surface by forming a dike thereacross, said method comprising the steps of:
    (a) laying down a length of tubing upon the surface across which the flow of fluid is to be restrained;
    (b) filling the tubing with a quantity of water to support an upper part of the tubing above the surface and to form the dike;
    (c) after said step of filling, closing the tubing at locations along the tubing separated from one another to retain the water within the tubing therebetween; and
    (d) conforming a lower part of the tubing with the perturbations and undulations of surface to restrain flow of the fluid between the surface and the lower part of the tubing.

12. The method as set forth in claim 11 wherein said step of closing includes the step of knotting the tubing.

13. The method as set forth in claim 11 including the step of placing granular material adjacent the surface and the lower part of the tubing to assist in restraining flow of the fluid past the tubing.

14. The method as set forth in claim 13 wherein said step of placing includes the step of converting the granular material to a putty-like consistency.

* * * * *